March 5, 1968   M. J. THOMPSON   3,371,903
BRACE ROD FOR REARVIEW MIRRORS
Filed Aug. 17, 1966
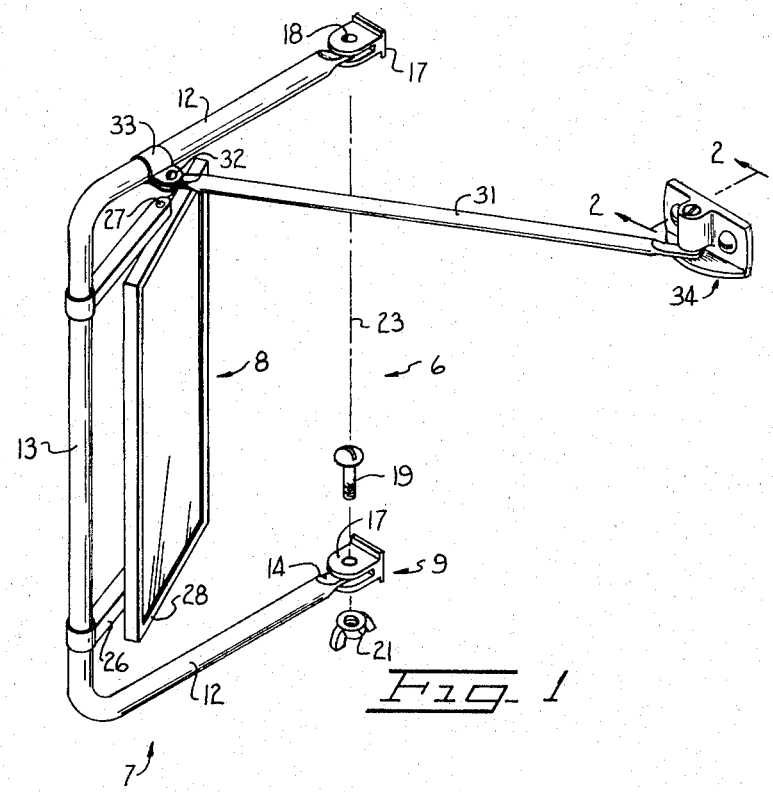
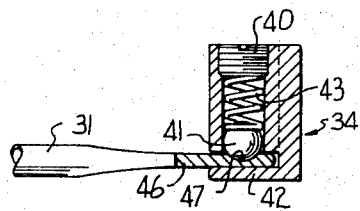
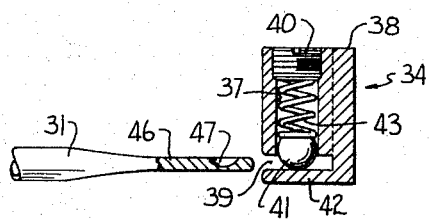
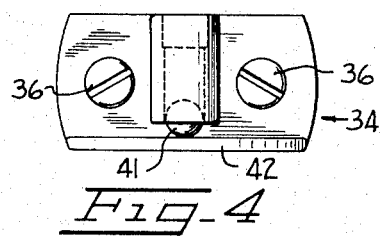
INVENTOR.
MAURICE J. THOMPSON
BY
Gardner & Zimmerman
ATTORNEYS

United States Patent Office 3,371,903
Patented Mar. 5, 1968

3,371,903
BRACE ROD FOR REARVIEW MIRRORS
Maurice J. Thompson, 1632 E. 14th St.,
Oakland, Calif. 94606
Filed Aug. 17, 1966, Ser. No. 572,973
7 Claims. (Cl. 248—486)

This invention generally relates to devices for supporting and mounting a rear vision mirror on the exterior of a vehicle, and is more particularly directed towards a bracing arrangement for such mirrors.

As is well known, highway safety dictates the use of rear vision mirrors on all vehicles. In practically all instances, trucks will be provided with externally mounted mirrors on the left-hand side of the vehicle, and frequently on the right-hand side as well. In order to provide for proper visibility, particularly in the case of larger trucks, the mirrors must be positioned at a substantial distance from the side of the truck. Thus, in such cases, brackets are provided which are secured to a fixed portion of the vehicle and which support the mirror itself in spaced relation to the vehicle.

It has heretofore been recognized that a mirror bracket which extends outwardly from the vehicle by a substantial distance presents certain problems. By way of example, such mirrors can strike an object, and if the bracket is rigid, the mirror, the bracket, and possibly the vehicle itself may be damaged. As a result, it is now common practice to use so-called swing-away mirrors, in which the mirror-supporting bracket is pivotally attached to the vehicle so as to permit swinging movement thereof upon engaging an external object, or deliberate inward movement when driving into a narrow area, when parking and the like.

While the swing-away mirrors have solved the problem above discussed, they have created other problems, among which are the tendency of the bracket to rattle, dislodge and/or vibrate to such an extent that their utility is substantially impaired.

It is accordingly an object of the present invention to provide a device for use with a swing-away mirror structure which will releasably retain a mirror support bracket in its selected position.

Another object of this invention is to provide a brace rod as above described which will serve to retain a swing-away bracket in an extended operative position, but which will automatically release the bracket for swinging movement if the bracket is hit by or otherwise engages an external object irrespective of the direction of vehicle movement.

A further object of the invention is to provide a brace device of the above character which will relocate a mirror bracket after the same has been swung away, and in which the degree of force required to permit bracket movement can be readily controlled.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a perspective view of the brace rod of the instant invention operatively connected to a swing-away mirror bracket.

FIGURE 2 is a cross-sectional view taken in the plane 2—2 of FIGURE 1.

FIGURE 3 is a view similar to FIGURE 2, but showing the rod in its bracket release position.

FIGURE 4 is a plan view of the brace rod housing support with the rod detached.

As above mentioned, the device of this invention is adapted to be utilized in connection with a swing-away mirror assembly, generally designated by the numeral 6 in FIGURE 1 of the drawing. This assembly includes a bracket 7, a mirror 8, and means 9 for pivotally mounting the bracket on a side portion of a vehicle (not shown). More particularly, bracket 7 consists of a U-shaped member having parallel legs 12 with one end of each leg being interconnected by an integral web 13. The bracket as here illustrated is formed of a continuous piece of tubing, and the ends of the legs remote from web 13 are flattened as indicated at 14. Such flattened portions are adapted for pivotal connection to the vehicle body by inserting the same between spaced ears 16 of support members 17, the latter being fastened to the vehicle in any suitable manner. The ears 16 are provided with apertures 18 which align with corresponding apertures in leg portions 14, so that a pin or screw 19 may pass through the apertures for pivotally supporting the bracket on the members 17. A wing nut 21 or the like may engage the screw 19 for holding the bracket in selected positions of rotational adjustment. It is of course understood that the members 17 are positioned so that their respective apertures lie on a common pivot axis 23 for the bracket.

Mirror 8 is adjustably positioned on the bracket by means of arms 26 extending from the web 13 with pins 27 extending through the distal ends of the arms and rotatably engaging the mirror frame 28. Thus, as is conventional with swing-away mirrors, the mirror is pivoted on the bracket and the bracket is in turn pivotally attached to the vehicle.

The foregoing construction is conventional, and it will be appreciated that if the pivotal connection of the bracket legs 12 to the members 17 is relatively loose, the bracket will constantly move or vibrate, and prevent proper adjustment or continued use of the mirror. On the other hand, if the connection is too tight, the driver may not conveniently deliberately swing the bracket between operative and inoperative positions, nor will the bracket freely swing inwardly if it strikes an object.

With the brace means of the present invention, the foregoing problems are overcome. Such means generally comprises a brace rod 31 having one end portion secured to bracket 7, and the other end portion attached to the vehicle. The rod is so arranged that it gives generally rigid stability to bracket 7 during normal operation, but will permit swinging movement of the bracket if an object is struck or if the driver deliberately desires a change in bracket position.

As here shown, one end of rod 31 is pivotally attached by a screw 32 or the like to a clamp member 33 which engages a leg 12 of the bracket 7. The other end of the rod is mounted in a housing 34 which is fastened to the vehicle by screws 36 or the like. The rod will provide a brace against movement of the bracket, and if both ends of the rod were attached by pivot pins or the like to clamp 33 and housing 34, movement of bracket 7 would be effectively prevented. The particular place of attachment of clamp 33 on the bracket will depend on the angular disposition of the bracket about axis 23.

In order to permit brace rod 31 to release the bracket upon application of a force thereto, the connection of the rod to housing 34, while permitting pivotal movement, is also displaceable. More specifically, housing 34 is provided with a bore 37 extending from one end 38 thereof. The bore terminates in an outwardly directed slot 39. A ball 41 is disposed in the bore and is normally urged against a shoe 42 underlying slot 39 by a spring 43. A threaded cap 40 is engaged in the upper end of the bore and bears against the upper end of the spring.

Rod 31 has one end 46 flattened so as to permit its insertion in slot 39, such insertion causing ball 41 to be forced upwardly against the pressure of the spring and then bearing against the upper surface of rod portion 46. The ball will act as a spring loaded detent in keeping the rod releasably affixed to the housing, and pivotal movement is still permitted by providing a recess or seat 47 in portion 46 which receives the ball when the rod is fully inserted in the housing.

By moving cap 40 inwardly or outwardly, the spring force is varied so that the amount of force required to permit withdrawal of the rod from the housing is readily determined.

Thus, in initial installation, the bracket 7 is first swung to its desired open or operative position. The end 46 of rod 31 is inserted in housing 34, and the bracket position will then dictate the location of attachment of clamp 33. The cap or plug 40 is then adjusted so as to provide the degree of resilient pressure on rod portion 46 as will retain it in position against normal vibrating shock loads, but permit it to be deliberately removed when the operator desires to swing bracket 7 inwardly, or automatically removed if the bracket should strike an object when the vehicle is moving. The detent and seat arrangement vies a substantially universal displacement, and other than for a direct axial load on rod 31, which is actually not possible in operation, the rod may be displacement irrespective of the direction of the load on bracket 7. A further advantage resulting from the use of this device is that after displacement, reseating of the rod in housing 34 will automatically reposition the bracket 7 in its original position.

What is claimed is:

1. A bracing device of the character described for use with a mirror supporting bracket pivotally attached to a vehicle, comprising an axially extending rod, a housing adapted to be secured to a vehicle, means in said housing for receiving one end portion of said rod and pivotally supporting the same, means on the other end portion of said rod for pivotal connection to said bracket, means resiliently retaining said rod in said housing and permitting withdrawal of the same upon a predetermined force applied to the rod by pivotal movement of said bracket.

2. A device as set forth in claim 1 in which said last named means includes a spring loaded detent engaging said received end portion of said rod.

3. A device as set forth in claim 2 in which said detent comprises a ball, and said received end portion of said rod is provided with a dished recess for releasably receiving said ball.

4. A device as set forth in claim 1 in which said one end portion of said rod is of generally flat cross-sectional configuration, said housing receiving means including a slot in which said end portion can be inserted, and said retaining means including a spring-loaded detent resiliently urgable towards said end portion upon insertion of the latter.

5. A device as set forth in claim 4 in which said slot extends for about 270 degrees of peripheral extent to facilitate insertion and removal of said rod in said housing.

6. A device as set forth in claim 1 in which said housing includes a base having fastening means for mounting the same on a vehicle, a bore extending from one end of the housing and having an axis generally normal to the base and terminating inwardly of the other end of the housing, and a slot extending to the periphery of the housing in communication with said bore, and a spring-loaded detent in said bore adapted to engage said end portion of the rod upon insertion into said slot.

7. A device as set forth in claim 6 including means in said bore for selectively varying the resilient force of said detent.

References Cited

UNITED STATES PATENTS

| | | | |
|---|---|---|---|
| 1,921,310 | 8/1933 | Crisman | 248—285 |
| 2,704,963 | 3/1955 | Parachek | 248—480 |
| 2,827,255 | 3/1958 | Kampa | 248—285 |

ROY D. FRAZIER, *Primary Examiner.*

F. DOMOTOR, *Assistant Examiner.*